(12) United States Patent
Stewart (10) Patent No.: US 6,538,343 B1
(45) Date of Patent: Mar. 25, 2003

(54) METHOD FOR REDUCING THE LOAD IMPOSED ON A POWER SOURCE, AND APPARATUS FOR IMPLEMENTING THE METHOD

(75) Inventor: Robert S. Stewart, Arlington, VA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 86 days.

(21) Appl. No.: 09/722,661

(22) Filed: Nov. 28, 2000

(51) Int. Cl.[7] .................................................. H02J 1/00
(52) U.S. Cl. .......................................... 307/38; 307/39
(58) Field of Search ...................................... 307/38, 39

(56) References Cited

U.S. PATENT DOCUMENTS

| | | | | |
|---|---|---|---|---|
| 2,874,310 A | * | 2/1959 | Young ..................... | 188/181 A |
| 3,970,861 A | * | 7/1976 | McCollum ................ | 200/38 B |
| 4,135,101 A | * | 1/1979 | Young et al. ................. | 307/3 |
| 4,337,401 A | * | 6/1982 | Olson ........................ | 307/39 |
| 4,402,059 A | * | 8/1983 | Kennon et al. ............. | 713/300 |
| 6,191,568 B1 | * | 2/2001 | Poletti ........................ | 315/360 |

* cited by examiner

*Primary Examiner*—Brian Sircus
*Assistant Examiner*—Sharon Polk
(74) *Attorney, Agent, or Firm*—Rabin & Berdo, P.C.

(57) ABSTRACT

A load reduction system switches from a commercial power distribution system to an onsite power source when a fault in the commercial distribution system is detected, and reduces the drain on the on-site power source by effectively eliminating 240 volt loads such as an electric water heater or stove. This load reduction accomplished by shifting the phase of 120 volt AC power that is applied to a user line by approximately 180°, so that the potential difference between this user line and another user line that receives 120 volt AC power is reduced from 240 volts AC to a small value. Power can still be received by 120 volt loads from the two user lines and a further, neutral, user line. A load reduction system in accordance with the present invention may also be employed with a portable generator, for example, to permit selective removal of 240 volt loads while the generator continues to power 120 volt loads.

20 Claims, 10 Drawing Sheets

METHOD FOR REDUCING THE LOAD IMPOSED ON A POWER SOURCE, AND APPARATUS FOR IMPLEMENTING THE METHOD

BACKGROUND OF THE INVENTION

The present invention is directed to a method and apparatus for controlling the amount of power that is extracted from an electrical power source, and more particularly to a system for reducing the total load imposed on a power source by individual loads that consume alternating current. A particularly useful application for the invention is to automatically drop 240 volt loads in a residence or small business, if commercial power is lost and the residence or small business switches to an on-site power source, while continuing to supply power from the on-site power source to 120 volt loads.

In the United States, utility companies usually supply their residential and small-business customers with 60 Hz AC power at two different voltages, one of these voltages having twice the magnitude of the other. The lower voltage is typically used for relatively light loads such as electric lighting and small appliances and the higher voltage is employed for heavier loads such as water heaters or air conditioners. Both the lower voltage and the higher voltage are usually expressed in terms of an effective or root-mean-square voltage since the instantaneous value of an AC voltage varies from moment to moment. The "effective voltage" means the DC equivalent of an AC voltage, or more precisely the DC voltage that would generate heat in a resistive load at the same rate as the AC voltage in question. For an AC voltage having a sinusoidal waveform the effective or rms voltage is the peak voltage of the waveform divided by the square root of two. In this document, terms such as "voltage" will be understood to refer to the effective voltage unless the instantaneous voltage or the peak voltage is explicitly mentioned.

Most loads found in a home or small business can operate satisfactorily over a range of voltages. A light bulb that glows brightly at 120 volts will be dimmer at 105 volts but will still produce light. A home or small business may also have voltage-sensitive loads such as electronic equipment but such loads usually include power supplies with voltage regulators, and hence they, too, can accommodate a reasonable range of voltages. This is fortunate since the power supplied by a utility company to its residential and small-business customers may vary in voltage even under normal conditions depending on a number of factors, such as the voltage at the generator, the total load imposed on the generator, and the distance between the customer and the generator. In the United States the lower voltage that is supplied by a utility company to its residential and small-business customers is usually 120 volts AC and the higher voltage is twice that, or 240 volts AC, but it is to be understood that these are nominal voltages and the precise values that are actually received by customers may vary from customer to customer and, for the same customer, from time to time. In this document, the term "120 volts" means the normal household voltage for running small appliances, even if the actual effective voltage departs somewhat from this value, and similarly the term "240 volts" is a nominal value.

It is an unfortunate fact of life that customers sometimes lose access to commercial power. Perhaps the power lines are broken during a storm, for example, or maybe it is necessary for the utility company's technicians to disconnect power lines while working on them. A customer who does not want to be inconvenienced during such outages may provide his own on-site power source, which is quickly switched in during an outage.

In order to be economically feasible for most customers, the capacity of an on-site power source must be relatively modest. The limited capacity may be insufficient for all the loads that happen to be turned on when an outage occurs. This problem is particularly acute if a water heater or other 240 volt load happens to be on.

One might consider monitoring for an outage and using electrically-controlled circuit breakers to switch off 240 volt loads when a fault occurs. The problem is, though, that conventional electrically-controlled circuit breakers have an operation time of up to 100 milliseconds. For 60 Hz power, this presents a six cycle delay in response time, and this delay may be sufficient to cause circuitry associated with the on-site power source to trip off-line due to a large instantaneous drain imposed by 240 volt loads. The result would be a complete loss of power, which defeats the customer's purpose in purchasing an on-site power source.

SUMMARY OF THE INVENTION

A primary object of the present invention is to provide a load reduction method and system which rapidly eliminate, or at least substantially reduce, 240 volt loads while maintaining 120 volt loads.

Another object is to control the effective AC voltage that is supplied to a load by varying the phase angle between AC potentials that are supplied to the load.

These and other objects that will become apparent in the ensuing detailed description can be attained by providing a load reduction method that comprises the steps of supplying AC power to a first-leg user line, supplying AC power to a second-leg user line which is normally about 180° out-of-phase with the first-leg user line, and changing the phase angle to about 0° in order to drop a load that is connected to the first-leg user line and the second-leg user line.

DESCRIPTION OF THE PREFERRED EMBODIMENTS

Figure 1:
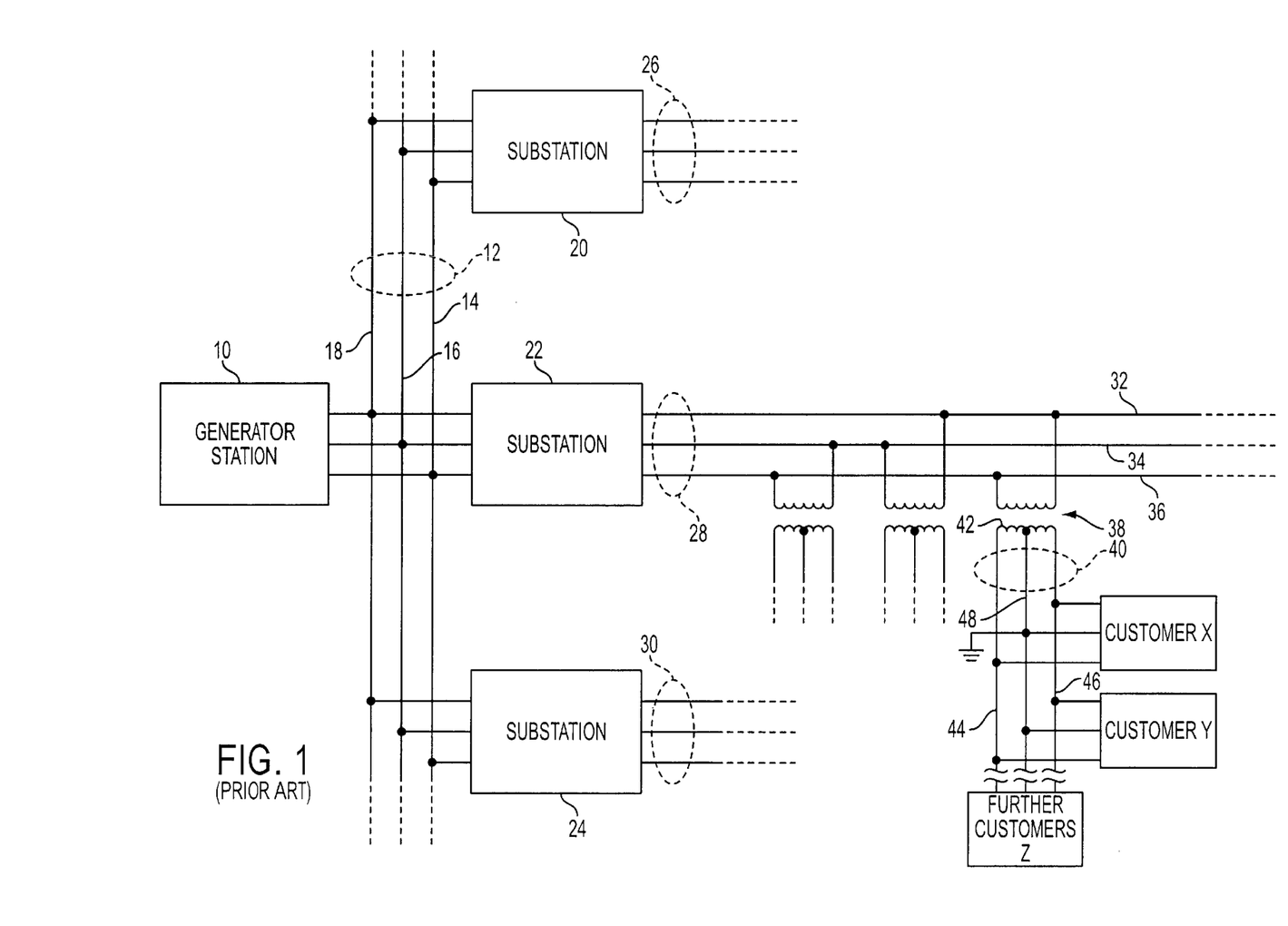
FIG. 1 schematically illustrates a typical power distribution system.

Before embarking on a detailed description of a load reduction method in accordance with the present invention and a load reduction system for implementing the method, an example of a typical commercial power distribution system operated by an electrical utility company will be briefly summarized with reference to FIG. 1.

In FIG. 1, a generator station 10 consumes fuel and generates electrical power which is supplied to a high-voltage primary distribution trunk 12. The trunk 12 includes a line 14 for a phase A, the line 16 for a phase B which is 120° out of phase with phase A, and a line 18 for a phase C, which is 120° out of phase with both phase A and phase B. That is, each of the three phases A, B, and C is separated from the other two phases by a phase angle of 120°. Substations 20, 22, and 24 are connected to the primary distribution trunk 12. The substations step down the voltage and supply it, still in three phases, to secondary power distribution trunks 26, 28, and 30. The secondary trunk 28, for example, includes a power line 32 which carries phase A, a power line 34 which carries phase B, and a power line 36 which carries phase C. Transformers are connected between these power lines to supply power to local distribution trunks. For example, a transformer 38 is connected between power lines 32 and 36 to supply electrical power, stepped down in voltage again, to a local distribution trunk 40 that supplies electrical power to customers in a residential neighborhood.

One end of the secondary winding 42 of transformer 38 is connected to a leg-1 power line 44 of the local trunk 40. The other end is connected to a leg-2 power line 46. The secondary winding 42 has a center tap that is connected to a neutral power line 48. The neutral power line 48 is grounded.

The potential between the leg-1 power line 44 and the neutral power line 48 typically has an effective or root-mean-square value of around 120 volts unless the power distribution system is suffering a so-called "brown-out" or other abnormality. The potential between the leg-2 power line 46 and the neutral power line 48 is also typically 120 volts AC. However, leg-1 power line 44 is 180° out of phase with leg-2 power line 46. This means that the AC voltage $V_{L1\ to\ L2}$ between leg 1 and leg 2 is 240 volts.

At this point it is appropriate to point out that the 180° phase difference between leg-1 power line 44 and leg-2 power line 46 should not be confused with the 120° phase difference between phases A, B, and C on trunk 28.

Figure 2:
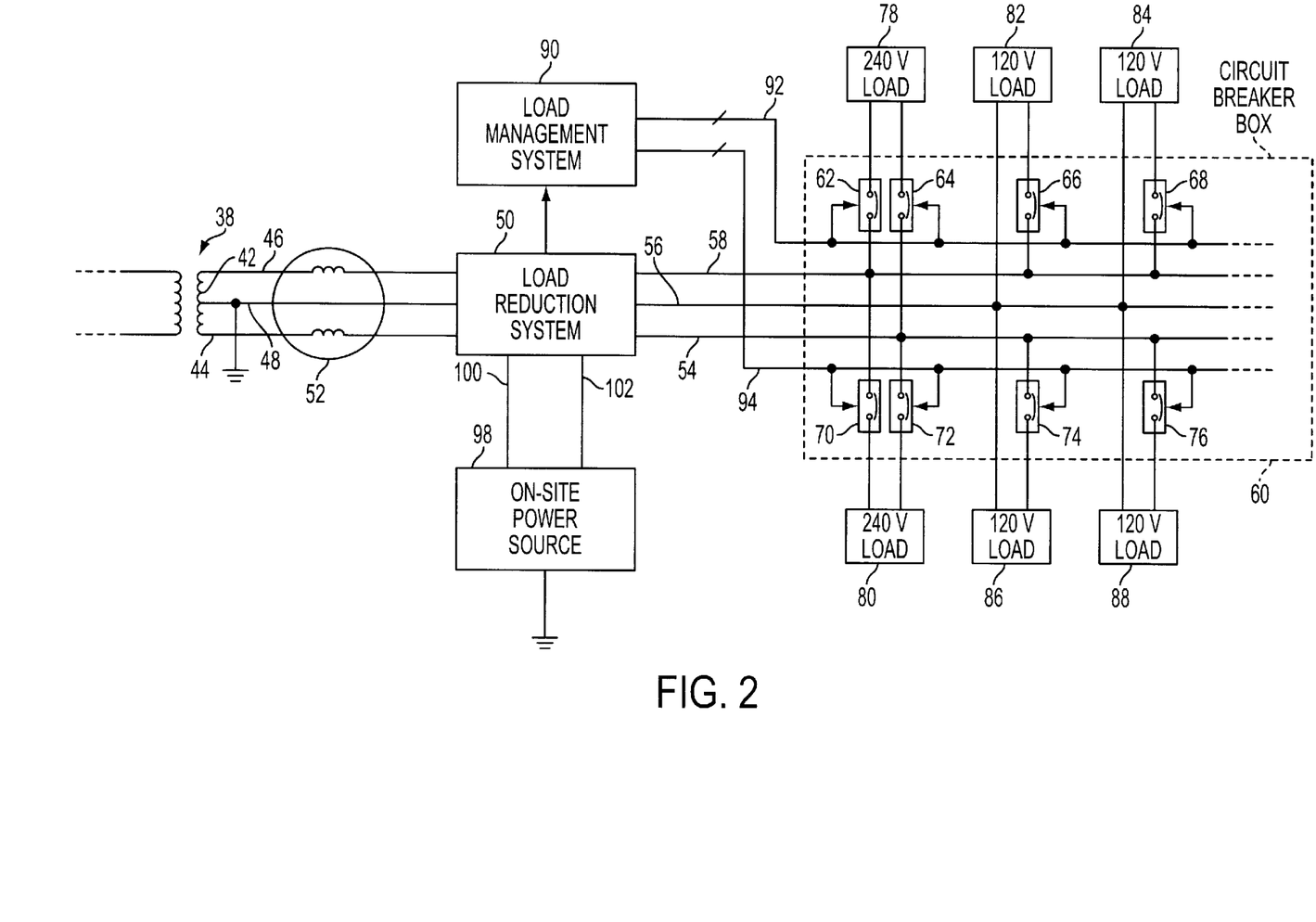
FIG. 2 illustrates a load reduction system in accordance with the present invention connected between the commercial power distribution system and power transfer wiring within the residence of a customer who also owns an on-site power source.

FIG. 1 shows customers X and Y as being among the customers that are served by local distribution trunk 40. A number of further customers Z may also be supported by the transformer 38, depending on its size and the load imposed by the customers. Each of these customers is connected to the leg-1 and leg-2 power lines 44 and 46 and to the neutral power line 48. The customer X, for example, employs a load reduction system in accordance with the present invention. This is shown in FIG. 2. In what follows, it will be assumed that customer X is a residential customer, although the load reduction system is also applicable to small businesses or other customers with 120/240 volt service. In addition, the same techniques could be used to reduce the phase-to-phase voltages in a three-phase service.

In FIG. 2, a load reduction system 50 in accordance with a first embodiment of the present invention is connected to the power lines 44, 46, and 48 via an interface (not shown in detail) which may include a watt-hour meter 52. The system 50 is in turn connected to a first-leg user line 54, a neutral user line 56, and a second-leg user line 58 within the residence of customer X. A circuit breaker box 60 is connected to the user lines 54, 56, and 58. The circuit breaker box 60 includes a number of electrically-controlled circuit breakers, including circuit breakers 62, 64, 66, 68, 70, 72, 74, and 76. Here, "electrically controlled" means that the circuit breakers 62–76 are not only opened if the current through them exceeds a predetermined maximum, they are also opened and closed by application of a control signal. This control signal can be an AC or DC voltage level applied to the device, or it can be a digital signal supplied by means of a power line carrier using the X- 10 protocol.

With continuing reference to FIG. 2, the circuit breaker box 60 is connected to a plurality of household circuits. The drawing illustrates two 240 volt circuits and four 120 volt circuits, but more circuits are commonly present in a household. The two 240 volt circuits that are shown in FIG. 2 convey power to a 240 volt load 78 and to a 240 volt load 80. The load 78 may be a water heater, for example, and the load 80 may be an electric stove. The four 120 volt loads that are shown in FIG. 2 are designated by reference numbers 82, 84, 86, and 88. The load 82, for example, may consist of electric lights in the living room of customer X's residence, along with a television or other appliances that are plugged into receptacles in the living room. Similarly, the load 84 may consist of lights in a pair of bedrooms and appliances that are plugged into receptacles in the pair of bedrooms.

The load reduction system 50 is connected to a load management system 90, which generates control signals that are conveyed to the circuit breakers 62–68 via a bus 92 and control signals that are conveyed to the circuit breakers 70–76 via a bus 94. An on-site power source 98 is conducted to the load reduction system 50 by cables 100 and 102.

Figure 3:
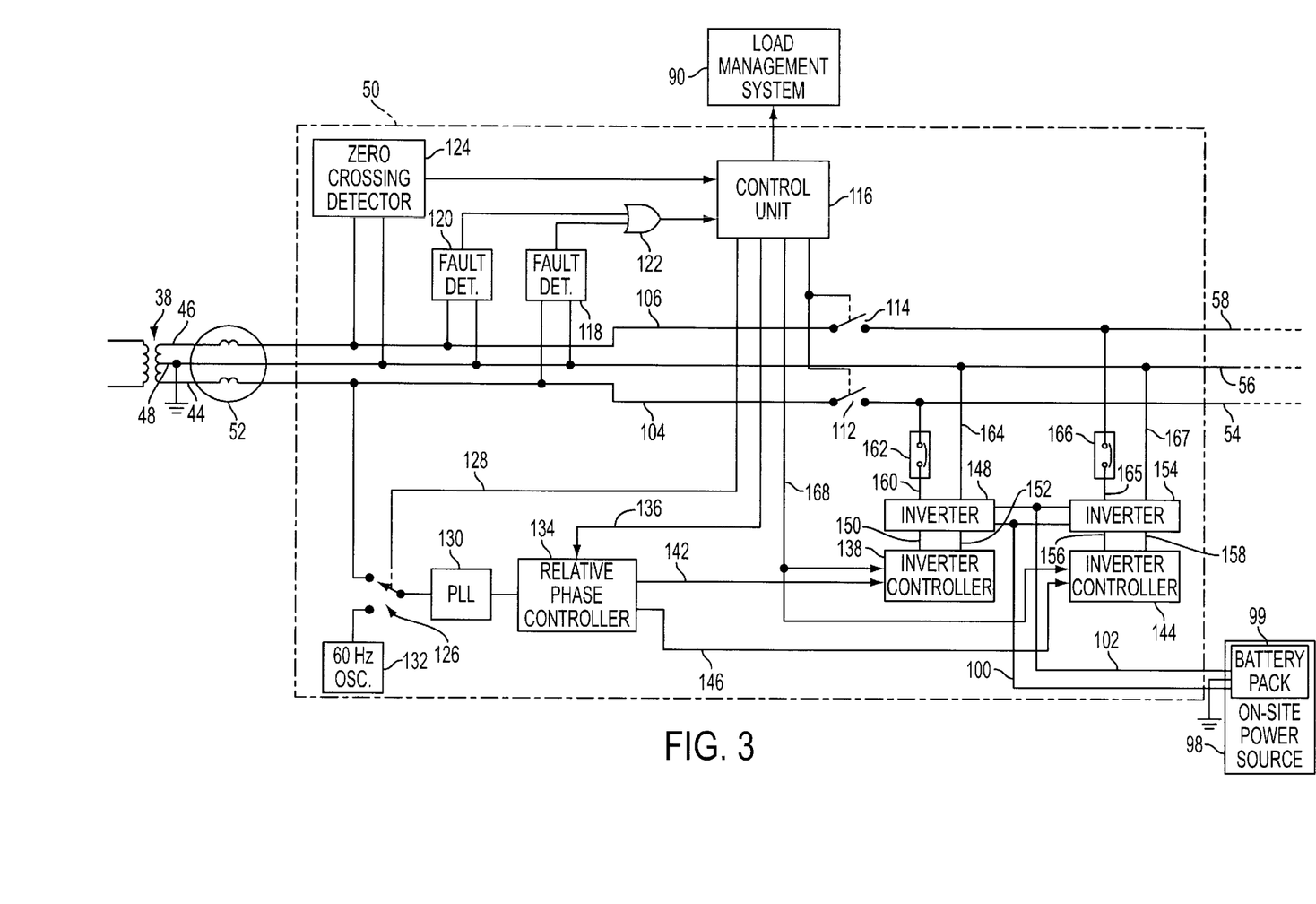
FIG. 3 is a block diagram of the load reduction system shown in FIG. 2.

Turning now to FIG. 3, the load reduction system 50 includes first and second input lines 104 and 106 that are respectively connected to the leg-1 power line 44 and the leg-2 power line 46 via the meter 52. A first electrically controlled switch 112 is connected between the first input line 104 and the first-leg user line 54, and a second electrically controlled switch 114 is connected between the second input line 106 and the second-leg user line 58. These switches can be either electromechanical or solid state. The switches 112 and 114 have control terminals that are connected to a control unit 116, which includes a microprocessor. The switches 112 and 114 selectively connect or disconnect the first and second input lines 104 and 106 from the first-leg and second-leg user lines 54 and 58 in accordance with trigger signals received from the control unit 116. The neutral user line 56 is connected to the neutral power line 98.

A first fault detector 118 is connected to the lines 104 and 56 and a second fault detector 120 is connected to the lines 106 and 56. The outputs of these fault detectors are OR-ed by a gate 122, which supplies a signal to the control unit 116 if a fault (typically a loss of voltage) appears on either leg. A zero crossing detector 124 signals the control unit 116 when the voltage on one of the legs changes from positive to negative or vice-versa.

An electrically controlled switch 126 receives a selection signal from the control unit 116 via a line 128 and connects the input of a phase locked loop 130 to either the first input line 104 or to a 60 Hz reference oscillator 132 in response to the selection signal. The output of the PLL 130 is supplied to a relative phase controller 134, which receives a phase control signal from the control unit 116 via a line 136. The relative phase controller 134 has a first output which is conveyed to a first inverter controller 138 via a line 142, and a second output which is conveyed to a second inverter controller 144 via a line 146. As will be discussed in more detail later, the line 142 carries a 60 Hz sinusoidal signal, synchronized (after the PLL 130 has locked) with either the leg-1 power line 44 or the reference oscillator 132 depending upon the state of switch 126. The line 146 also carries a 60 Hz signal. Its phase may either be approximately the same as that of the signal carried by line 142 or approximately opposite the phase of the signal carried by line 142, depending upon the phase control signal received on line 136. That is, the 60 Hz signal carried by line 146 has either an approximately zero degree phase difference with respect to the 60 Hz signal carried by line 142 or an approximately 180° phase difference.

The first inverter controller 138 is connected to a first inverter 148 by lines 150 and 152. Similarly, the second inverter controller 144 is connected to a second inverter 154 by lines 156 and 158. The first inverter 148 has an output that is connected by a line 160 to a circuit breaker 162, which is connected to the first-leg user line 54. The inverter 148 also has an output that is connected by a line 164 to the neutral line 56. The second inverter 154 has an output that is connected via a line 165 and a circuit breaker 166 to the second-leg user line 58 and another output that is connected by a line 167 to the neutral line 56.

The control unit 116 supplies the inverter controllers 138 and 144 with an enable signal via a line 168.

An overview of the operation of load reduction system 50 will now be presented with reference to FIGS. 1–3. When customer X is receiving power normally from the utility company over local distribution trunk 40, control unit 116 continuously triggers switches 112 and 114 to keep the first-leg user line 54 connected to the leg-1 power line 44 and the second-leg user line 58 connected to the leg-2 power line 46. Customer X's circuit breaker box 60 thus receives power from the utility company and conveys this power to the 120 volt loads and the 240 volt loads that are connected to the circuit breaker box 60. If the current drawn by any of these loads becomes excessive, the relevant circuit breaker (e.g., 62–76) will open to disconnect that load. During this period of normal operation, the load management system 90 provides signals on buses 92 and 94 that permit the circuit breakers to conduct unless the current becomes excessive.

A fault may occur if the primary winding of transformer 38 stops receiving power from the substation 22. For example, the power line 36 may be broken between the substation 22 and the transformer 38. In this case, detectors 118 and 120 would both detect a fault. In rare instances a fault might occur on the secondary side of the transformer 38 in a manner such that one of the first and second legs 44 and 46 remains good but the other experiences a fault. In such a situation, only one of the detectors 118 and 120 would detect a fault, but this would be enough to signal a fault to the control unit 116.

In response to a fault, the control unit 116 deactuates the switches 112 and 114 to isolate the first-leg and second-leg user lines 54 and 58 from the leg-1 and leg-2 power lines 44 and 46. The control unit 116 also signals the switch 126 to connect the 60 Hz reference oscillator 132 to the PLL 130 and signals the relative phase controller 134 to control the phase of the 60 Hz signal on line 146 so that it is approximately in-phase with the 60 Hz signal on line 142. The control unit 116 additionally enables the inverter controllers 138 and 144 via line 168, and as a result the inverter 148 supplies 60 Hz power to the first-leg user line 54 and the inverter 154 supplies approximately in-phase 60 Hz power to the second-leg user line 58. Thus, when a fault is detected customer X continues to receive power from his on-site power source 98. However, the phase of the power supplied to the second-leg user line 58 is changed by 180° (or approximately 180°). The significance of this phase change will be discussed with reference to FIGS. 4A, 4B, and 4C.

Figure 4A:
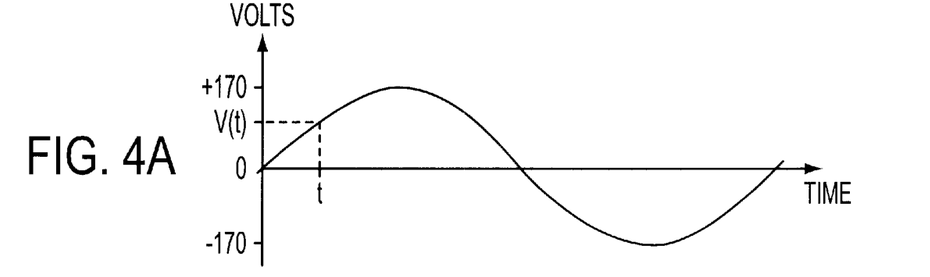
FIGS. 4A–4C illustrate voltage waveforms.
Figure 4B:
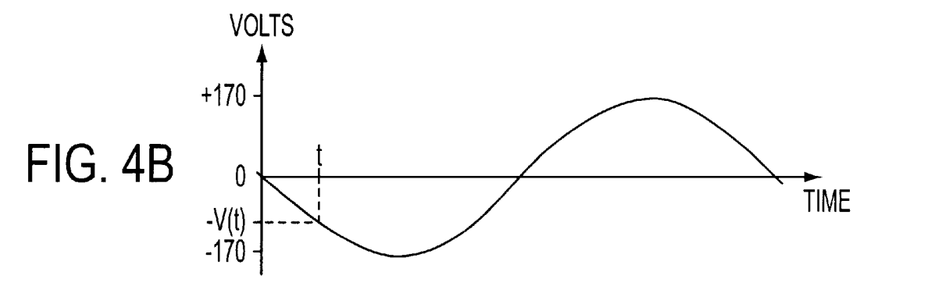
Figure 4C:
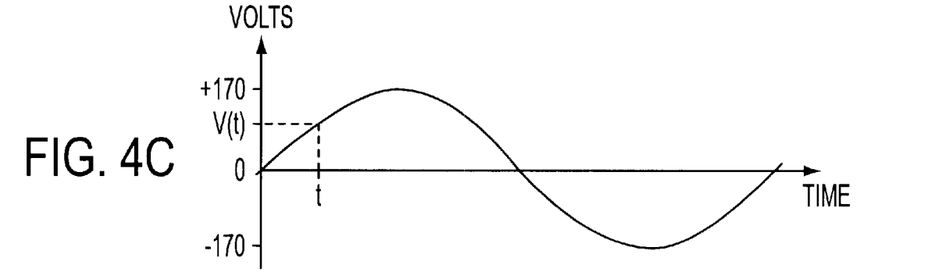

FIG. 4A illustrates one cycle of a 60 Hz, 120 volt effective (around 720 volt maximum) sinusoidal waveform. FIG. 4B also illustrates one cycle of a 60 Hz, 120 volt waveform. The difference between FIGS. 4A and 4B is that the waveform shown in FIG. 4B is 180° out-of phase with the waveform shown in FIG. 4A. At some particular time t, the waveform of FIG. 4A has a value V(t) and the waveform of FIG. 4B has a value of −V(t). The difference between these waveforms at the time t is thus 2V(t). This is the situation that normally applies when the transformer 38 (see FIG. 1) is supplying power from the utility company to the customers connected to local distribution trunk 40. The customer X receives 120 volts AC between leg-1 power line 44 and neutral local power line 48, and 120 volts also between leg-2 power line 46 and the neutral power line 48. Either the first leg or the second leg can supply power for driving customer X's 120 volt loads. However, the legs are 180° out-of-phase. It is easy to see from FIGS. 4A and 4B that customer X also receives 240 volts AC (rms) between the leg-1 and leg-2 power lines 44 and 46 for driving 240 volt loads.

However, when a fault occurs and the load reduction system 50 switches to the on-site power source 98, the loads that are currently being supplied with power might overload the on-site power source 98. That is, unless customer X has invested in an on-site power source 98 that is sufficiently powerful to drive all of the loads in customer X's residence if they happened to be on at the time of fault, the source 98 will need to conserve power. The source 98 typically includes a battery pack 99 and means for charging the battery pack (such as a generator run by an internal combustion engine or a windmill, or a photovoltaic array, a fuel cell, a microturbine, or a charging system that receives power from the utility company except during a fault, none of which are shown*). A battery pack with the capacity to drive all of the loads that are present in a typical household would be expensive indeed. The 240 volt loads (water heater, electric stove, air conditioner, and so forth) are particularly heavy. The demands imposed on the on-site power source 98 can be reduced considerably if the 240 volt loads are dropped during a fault.

One way to drop 240 volt loads during a fault would be to open the electrically controlled circuit breakers that are connected to the 240 volt loads (e.g., reference number 62, 64, 70, and 72 in FIG. 2). This solution is not entirely satisfactory, however, since electrically controlled circuit breakers that are currently on the market tend to be relatively slow. A typical delay time for opening an electrically controlled circuit breaker in response to a control signal would be 0.1 seconds. If customer X's electric stove, air conditioner, and water heater all happen to be on at the time of a fault, the result would an extremely heavy drain on the on-site power source 98 for 0.1 seconds before the electrically controlled circuit breakers release the 240 volt loads. Although the heavy drain would be brief it might be sufficiently severe to impair the on-site power source or trip it off, particularly if the on-site power source has only a modest capacity. Furthermore, the heavy drain might disrupt any voltage-sensitive electronic appliances (e.g., computers) that happen to be turned on at the time of the fault.

The load reduction system 50 of the present embodiment responds quickly when a fault occurs. As will be discussed in more detail later, the load management system 90 can then open selected electrically controlled circuit breakers to switch off loads that are deemed to have a low priority and thereby bring higher priority loads within the capacity of the on-site power source 98.

The 240 volt loads are dropped by switching the waveform of the power applied to one of the legs. It will be appreciated from FIGS. 4A–4C that the result of a 180° phase shift on either leg will be a voltage of zero between the legs (or a voltage that is low if the phase shift is around 180° but not exactly 180°). For example, if the waveform shown in FIG. 4B is shifted in phase by 180°, the result is the waveform shown in FIG. 4C. The 240 volt AC difference between FIGS. 4A and 4B is transformed into a zero volt AC difference between FIGS. 4A and 4C.

Figure 5:
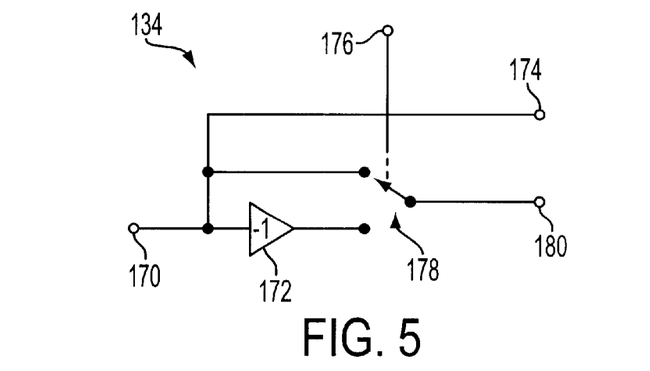
FIG. 5 illustrates circuitry suitable for use as the relative phase controller in FIG. 3.

Circuitry suitable for use as the relative phase controller 134 is shown in FIG. 5. An input terminal 170 receives the output of PLL 130 and conveys it to an inverting amplifier 172. The output of the PLL 134 is also conveyed to a first output terminal 174 that is connected via the line 142 to the first inverter controller 138. A control signal input terminal 176 is connected to line 136 to receive the phase control signal from the control unit 116. The phase control signal determines the state of an electrically controlled switch 178. In one state the switch 178 conveys the output of PLL 130 to a second output terminal 180, which is connected via the line 146 to the second inverter controller 144, and in its other state the switch 178 connects the inverted signal from amplifier 172 to the second output terminal 180.

A variety of inverters and inverter controllers that are suitable for use as elements 138, 144, 148, and 154 are known in the art. Nevertheless, simple implementations will now be described for the sake of completeness, it being understood that more sophisticated implementations would normally be used in practice.

Figure 6:
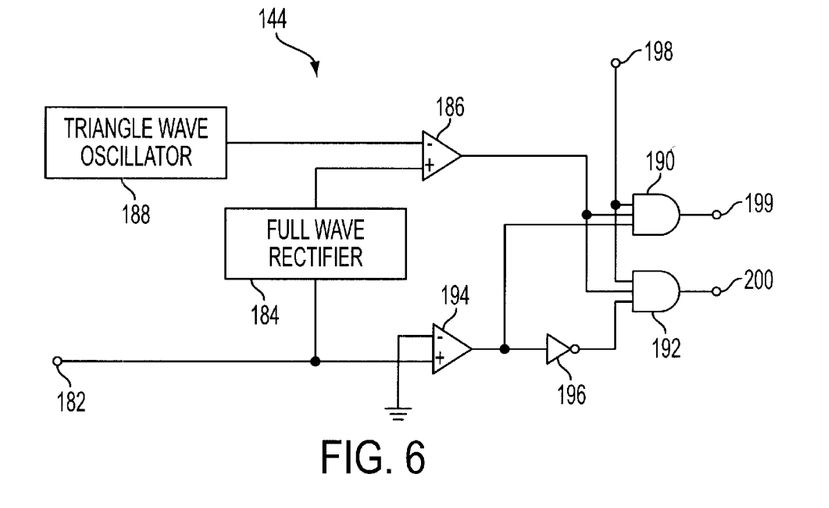
FIG. 6 illustrates circuitry for use as one of the inverter controllers in FIG. 3.
Figure 7A:
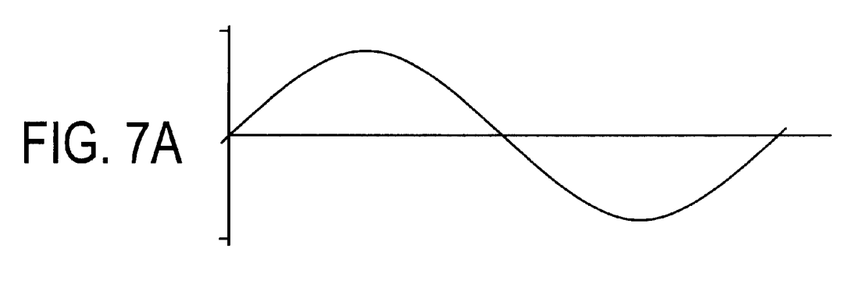
FIGS. 7A–7G illustrate waveforms useful for explaining the operation of the inverters and inverter controllers in FIG. 3.
Figure 7B:
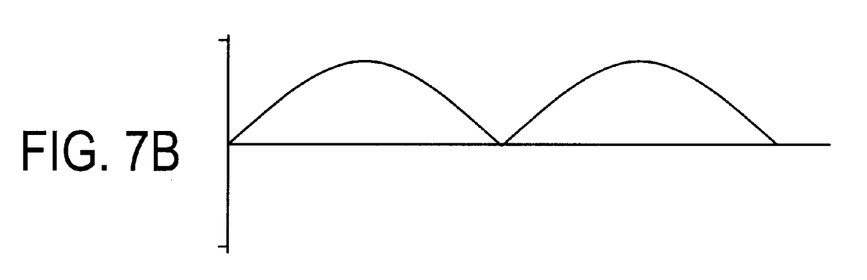
Figure 7C:
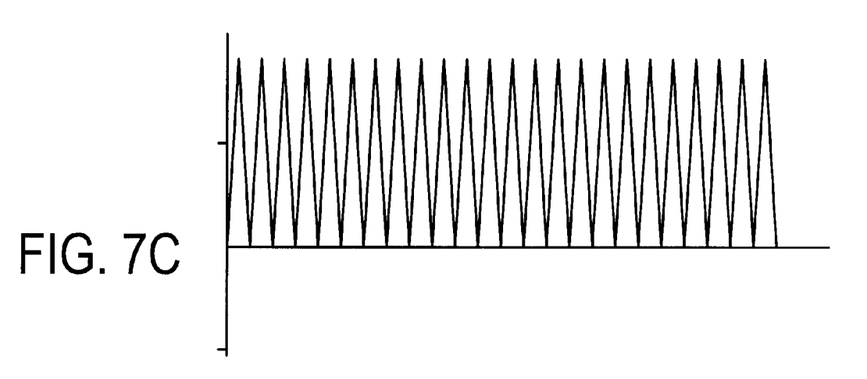
Figure 7D:
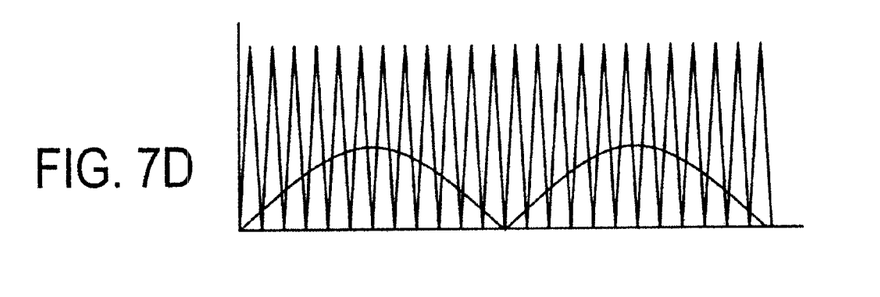
Figure 7E:
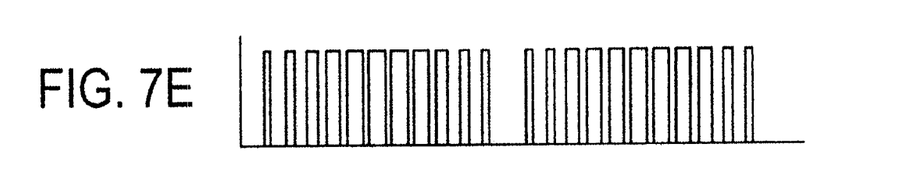

FIG. 6 illustrates an example of simple circuitry for the second inverter controller 144 (the same circuitry could also be used for first inverter controller 138). The inverter controller 144 includes an input terminal 182 which is connected to line 146 and which receives a sinusoidal signal as shown in FIG. 7A from the relative phase controller 134. The input signal is full-wave rectified at 184 to generate the signal shown in FIGS. 7B, which is supplied to one input terminal of a comparator 186. The other input terminal of the comparator 186 receives a triangle wave, as shown in FIG. 7C, from an oscillator 188. FIGS. 7D shows the triangle wave of FIG. 7C superimposed on the rectified waveform of FIG. 7B. The output of comparator 186 is digitally low except when the rectified sine wave has a magnitude greater than the magnitude of the triangle wave. This output is illustrated in FIG. 7E. It will be seen from FIG. 7E that the output of comparator 186 is a pulse-width modulated signal which digitally represents the rectified sine wave. The pulse-width is broadest at the peaks of the rectified sine wave and grows narrower on either side of the peaks. This pulse-width modulated signal from comparator 186 is supplied to one input of an AND gate 190 and also to one input of an AND gate 192.

Figure 7F:
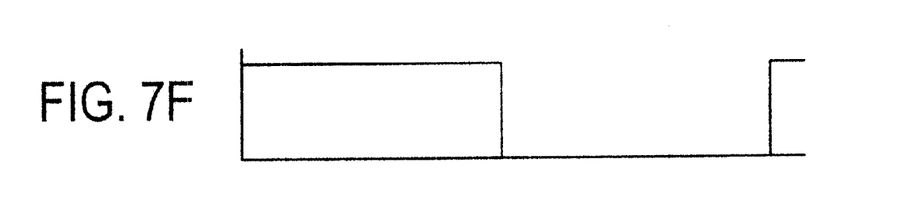

The input signal from terminal 182 (see FIG. 7A) is also supplied to an input of a comparator 194, which compares the input signal to a potential of zero volts. During the positive half-cycle of the input signal, the output of comparator 194 is high, as shown in FIG. 7F, and during the negative half-cycle it is low. This output is conveyed to an input of AND gate 190 and also, via an inverter 196, to an input of AND gate 192.

A terminal 198 is connected to the control unit 116 to receive the enable signal via line 168. When the enable signal is high and the output of comparator 194 is also high, AND gate 190 passes the pulse-width modulated signal from comparator 186 to an output terminal 199. The output terminal 199 is connected to line 156 (see FIG. 3). On the other hand, when the enable signal is high and the output of comparator 194 is low, the pulse-width modulated signal from comparator 186 is passed via AND gate 192 to an output terminal 200. The terminal 200 is connected to the line 158 (FIG. 3).

Figure 8:
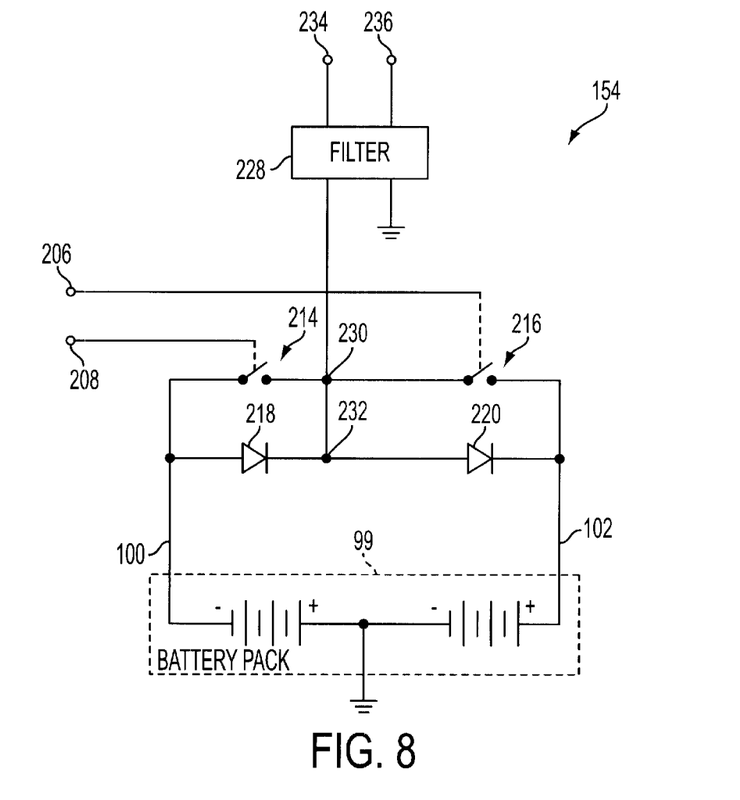
FIG. 8 illustrates circuitry suitable for use as one of the inverters in FIG. 3.

A simple example of circuitry for inverter 154 (or inverter 148) is shown in FIG. 8. Input terminal 206 is connected to line 156 and input terminal 208 is connected to line 158. Electrically controlled switches 214 and 216 are connected in series with one another between cables 100 and 102 from battery pack 99. Diodes 218 and 220 are also connected between the cables 100 and 102. A smoothing filter 228 has an input port that is connected to an intermediate connection point 230 between the switches and to an intermediate connection point 232 between the diodes. Another input port is connected to ground. An output terminal 234 of filter 228 is connected to line 165 (see FIG. 3) and an output terminal 236 is connected to line 167 (FIG. 3).

Figure 7G:
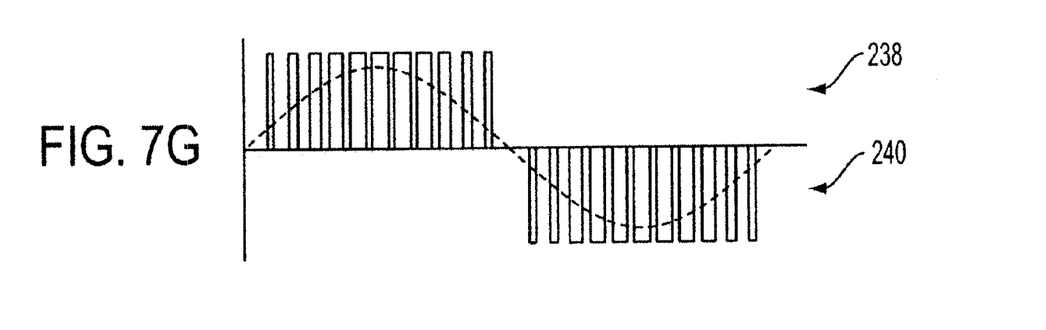

The operation of inverter controller 144 and inverter 154 will now be described with reference to FIGS. 3, 6, and 8. The input terminal 206 of inverter 154 receives a pulse-width modulated pulse train from output terminal 199 of inverter controller 144 during the positive half-cycle of the sinusoidal input signal applied to terminal 182, assuming that the inverter controller 144 is enabled by a signal received at terminal 198 from control unit 116. As a result, switch 216 closes in synchronism with the pulse-width modulated pulse train, thereby connecting filter 228 to cable 102 (which is connected to the positive terminal of battery pack 99) during the period 238 shown in FIG. 7G. Switch 216 remains open during the negative half-cycle of the signal applied to terminal 182, and terminal 208 receives a pulse-width modulated pulse train from terminal 200 of inverter controller 144. This actuates switch 214 to connect filter 208 to cable 100 (which is connected to the negative terminal of battery pack 99) as shown by reference number 240 in FIG. 7G. A sinusoidal waveform that is superimposed on the pulse-width modulated switching pattern shown in FIG. 7G represents the filtered output across terminals 234 and 236. This voltage is applied across the second-leg user line 58 and the neutral user line 56. Similarly, inverter 148 applies a sinusoidal voltage waveform across the first-key user line 54 and the neutral user line 56.

The overall operation of the load reduction system 50 in accordance with this embodiment will now be described with reference to FIGS. 3 and 9. The control unit 116 repeatedly checks (step 242) to ascertain whether a fault has been detected. If so, OR gate 122 turns on and supplies a fault signal to the control unit 116. If a fault if detected ("Y" at step 242), the control unit 116 quits triggering switches 112 and 114 (step 244), thereby disconnecting the first input line 104 from the first-leg user line 54 and also disconnecting and the second input line 106 from the second-leg user line 58. During step 246 the control unit 116 emits a selection signal on line 128 to change the state of switch 126, thereby connecting the PLL 130 to the 60 Hz reference oscillator 132 rather than to the first input line 104. Instead of tracking the waveform of the commercial utility company, the PLL 130 now begins tracking the waveform of oscillator 132. Since commercial utility companies normally control the frequency of their power accurately to 60 Hz, the frequency supplied to PLL 130 will not change when switch 126 connects it to oscillator 132. The phase will generally be different but PLL 130 can lock onto the new phase quickly, with at most a small, transient irregularity appearing in the output of PLL 130. The output then becomes a 60 Hz sinusoidal signal that is supplied to relative phase controller 134.

In step 248, the relative phase controller 134 receives a phase control signal from control unit 116 via line 136 to set the phases of the 60 Hz signals appearing on lines 142 and 146 to be the same (that is, in FIG. 5 the switch 178 connects terminal 180 to terminal 170). Then, in step 250, the control unit 116 emits the enable signal via line 168 to the first and second inverter controllers 138 and 144. The first inverter controller 138 then controls the first inverter 148 to supply 60 Hz AC power across first-leg user line 54 and the neutral user line 56. Additionally, the second inverter controller 144 controls the second inverter 154 to supply 60 Hz AC power across second-leg user 58 and neutral user line 56. Since the phase of the power supplied to the first-leg and second-leg user lines 54 and 58 is the same, the voltage between them is zero. As a result, the on-site power source 98 is called upon only to supply power to 120 volt loads that may happen to have been switched on at the time of the fault, but not to 240 volt loads.

The control unit 116 signals the load management system 90 that a fault has occurred in step 252. The purpose of load management system 90, which is not part of the present invention, is to select those loads which will continue to receive power after a fault. One way to do this would be by assigning priorities to all of the loads, identifying highest-priority loads that will not overwhelm the on-site power source 98 if all of the highest-priority loads happen to be on when a fault occurs, and opening the electrically controlled circuit breakers for the lower priority loads when a fault occurs. Although the circuit breakers respond relatively slowly, the on-site power source 98 would not encounter a severe drain imposed by 240 volt loads while the low-priority loads are switched off because the 240 volt loads have already been effectively eliminated by virtue of the matched phase on first-leg and second-leg user lines 54 and 58. If all of the higher priority loads are not on when a fault occurs, the load management system 90 can monitor the current supplied by on-site power source 98 and begin switching lower-priority loads back on until the current capacity of on-site power source 98 is reached.

Figure 9:
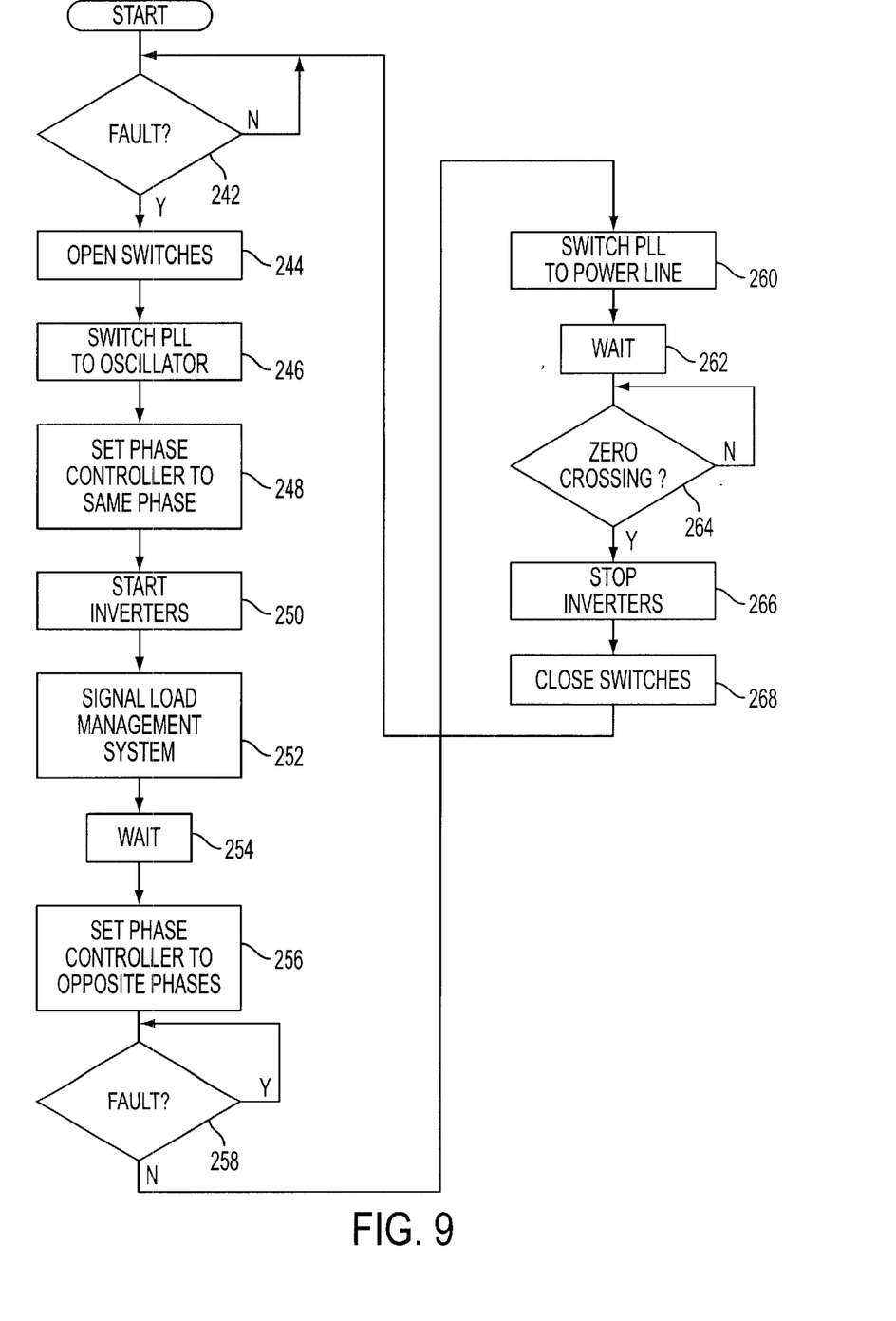
FIG. 9 is a flowchart illustrating the operation of FIG. 3.

FIG. 9 illustrates a wait step 254 while load management system 90 adjusts the electrically controlled circuit breakers within circuit breaker box 60 so as to select the loads that will receive power from on-site power source 98 during the fault. This may include one or more of the 240 volt loads, depending upon their priority, how many of the higher priority loads were turned on before the fault, and the capacity of the on-site power source 98. In step 256, the control unit 116 signals relative phase controller 134 via line 136 to set a phase difference of 180° between lines 142 and 146. This is accomplished by changing the state of switch 178 (FIG. 5) so that output terminal 180 is connected to the output of inverting amplifier 172, thereby changing the phase of the waveform supplied to the second inverter controller 144 by 180°. This restores 240 volt AC power between first-leg and second-leg user lines 54 and 58 so that any high priority 240 volt loads that are within the capacity of on-site power source 98 can be returned to service.

Although a load management system as discussed above is preferred, a load management system need not necessarily be used with the present invention. In a less sophisticated approach, the electrically controlled feature of the circuit breakers 62–72 within circuit breaker box 60 of FIG. 2, along with the load management system 90 itself, could be dispensed with. Any 120 volt loads that happen to be on at the time of a fault would then receive power from on-site power 98, and all 240 volt loads would be dropped by keeping the phase of the power supplied to the first-leg and second-leg user lines 54 and 56 the same. Steps 252–256 in FIG. 9 could then be omitted.

After step 256, the control unit 116 repeatedly checks (step 158) to ascertain whether the fault still exists. If it has been corrected and commercial power has returned ("N" at step 158), the control unit 116 signals switch 126 to re-connect the PLL 130 to the first input line 104 during step 260. A brief wait is imposed at step 262 to permit the PLL 130 to lock onto the phase of the commercial power. When the control unit 116 receives a signal from zero crossing detector 124 indicating that the waveform of the commercial power has passed through zero ("Y" at step 264), it removes the enable signal from line 168 to stop the inverters 138 and 144 (step 266) and starts triggering switches 112 and 114 again (step 268). The program then returns to step 242 in order to be on the lookout for another fault.

Figure 10:
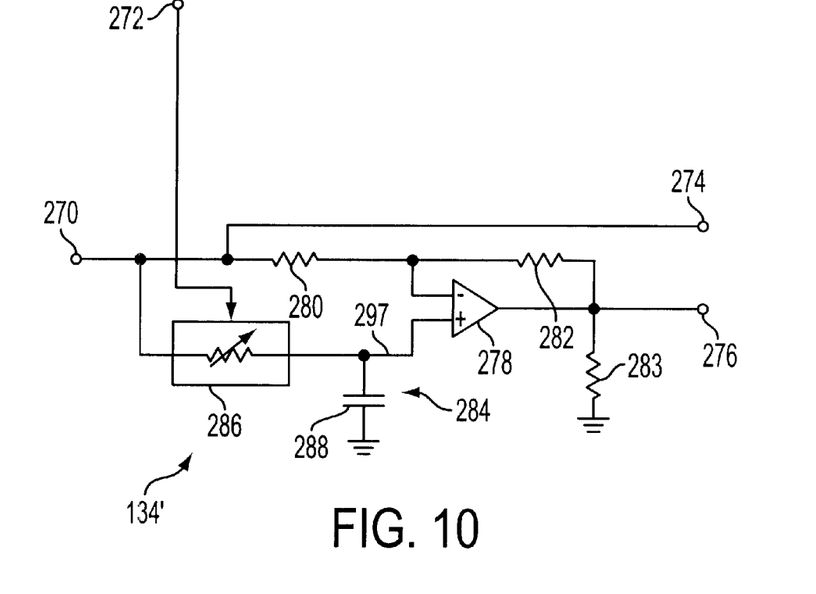
FIG. 10 illustrates circuitry for a relative phase controller in another embodiment of the load reduction system.

A second embodiment of a load reduction system in accordance with the present invention will now be described. The second embodiment is the same as the system 50 shown in FIG. 3, except that relative phase controller 134 is replaced by a relative phase controller 134' as shown in FIG. 10. The purpose of relative phase controller 134' is to permit what might be called a "soft start-up" of any 240-volt loads that are to receive power during the fault. This occurs during step 256 in FIG. 9.

The relative phase controller 134' includes an input terminal 270 which receives the sinusoidal output signal from PLL 130. A terminal 272 is connected to line 136 to receive the phase control signal from control unit 116. A first output terminal 274 is connected to line 142 and passes the sinusoidal waveform applied to terminal 270 unchanged to the inverter controller 138. A second output terminal 276 is connected to line 146 and to the second inverter controller 144.

The relative phase 134' controller also includes an op amp 278, an input resistor 280 connected between the terminal 270 and the inverting input of the op amp 278, a feedback resistor 282 connected between the output of amplifier 278 and the inverting input of the amplifier 278, and a load resistor 283 that is connected between the output of amplifier 278 and ground. The output terminal 276 receives the output signal from amplifier 278. A low-pass filter 284, which includes an electrically variable resistor 286 and a capacitor 288, is connected to the noninverting input of the amplifier 278.

The phase control signal applied to terminal 272 controls the resistance of variable resistor 286 so that the resistor 286 has an initial, relatively low resistance for a brief period during "wait" step 154 in FIG. 9. Thereafter, the phase control signal raises the resistance value of resistor 286 from the initial value to a final high value (effectively infinity) during a three-second interval for the soft start-up. It can be shown that the phase angle $\theta$ between the waveforms at terminals 274 and 276 is given by the following approximation.

$$\theta = -2 \arctan 2\pi fRC \quad (1)$$

In expression (1), f represents the frequency of the signal applied to terminal 270 in Hertz, R presents the resistance of resistor 286 (and also resistor 294) in Ohms, and C represents the capacitance of capacitor 288 in Farads. In the arrangement shown in FIG. 10, the phase angle θ is 180° when R is inifinity, meaning the period after the conclusion of the three-second interval for the soft start-up. However, if the variable resistor 286 has a non-zero minimum value for R, the phase angle θ cannot be 0°. The phase angle can be made small, though, even with a minimum value of R that is in the kilohm range, and the voltage between the first-leg user line 54 and the second-leg user line 58 can be reduced to such a degree that little energy is actually lost to 240 volt loads. For example, if resistor 286 has a minimum value of 5 kΩ and capacitor 288 has a value of 0.01 μf, then expression (1) yields a value for the phase angle θ of about −2.2°. The voltage between the first and second legs 54 and 58 then becomes:

$$V_{L1 \ to \ L2} = A \sin \omega t - A \sin (\omega t - 2.2°) \quad (2)$$

$$= A \sin \omega t - A [\sin \omega t \cos (-2.2) - \omega t \sin (-2.2°)] \quad (3)$$

$$= A \sin \omega t - 0.999 A \sin \omega t + 0.038 A \cos \omega t \quad (4)$$

$$= 0.0001 \, A \sin \omega t + 0.038 A (1 - \sin^2 \omega t)^{1/2} \quad (5)$$

Here, A is the peak value of the voltage (about 170 volts when the rms value is 120volts), ω is the angular frequency (21,600°/second for 60 Hz), and t is time. It will be seen that the peak voltage difference between first leg user line 54 and second-leg user line 58 is less than 7 volts when θ=−2.2° and A=170 volts, and the effective voltage difference is even less.

Figure 11:
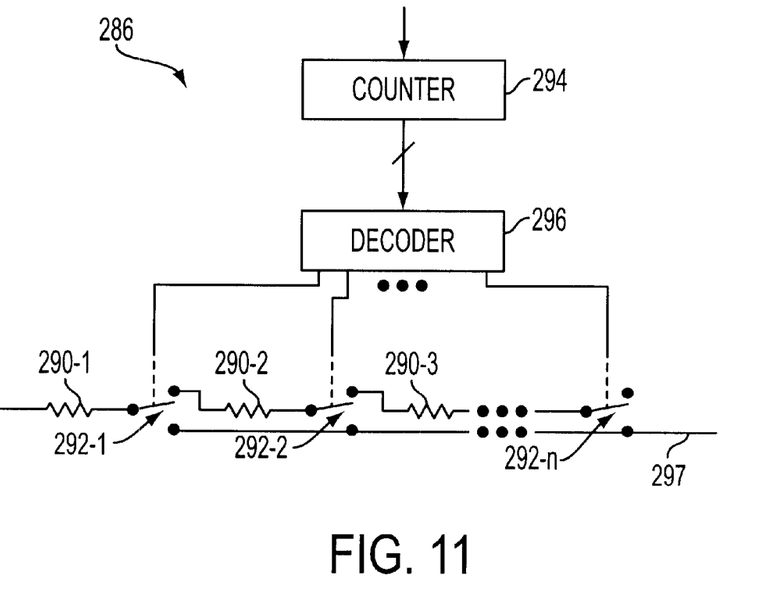
FIG. 11 illustrates circuitry for implementing an electrically variable resistor that is shown in FIG. 10.

One way to implement the variable resistor 286 is shown in FIG. 11. It includes a sequence of resistors 290-1, 290-2, . . . , 29n and electrically-controlled SPDT switches 292-1, 292-2, . . . , 292n. The first resistor, 290-1, receives the sinusoidal signal from terminal 270. A counter 294 receives the phase control signal from terminal 272 (the phase control signal in this case is a pulse train emitted by the control unit 116) and provides a binary count of the pulses to a decoder 296. Before the first pulse, the output of the counter 294 is all zeros and the decoder 296 provides an output such that the switches 292 connect all of the resistors 290 to a conductor 297, which is connected to capacitor 288 and the non-inverting input of amplifier 287. After the first pulse, switch 292-1 connects resistor 290-1 in series with resistor 290-2. After the next pulse, resistor 290-3 is added to the series, and so on. The resistance value of the variable resistor 286 rises, pulse-by-pulse, until the last pulse in the pulse train causes the switch 292-n to disconnect the series of resistors 290 from the conductor 297.

Figure 12:
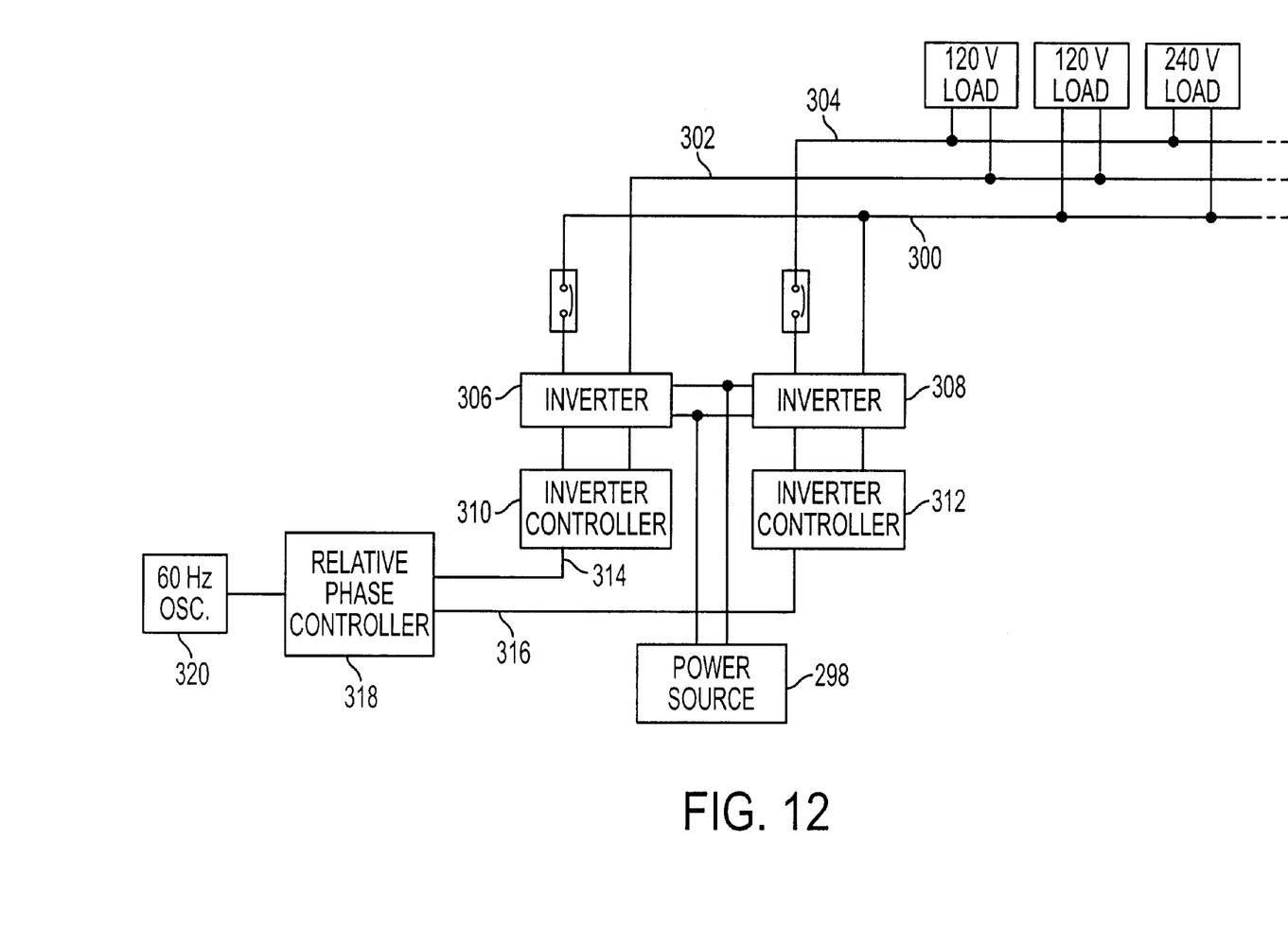
FIG. 12 illustrates circuitry for an embodiment in which a local power source is used as the primary power source rather than as a back-up power source for a utility company.

FIG. 12 illustrates another embodiment, in which a power source 298 is the primary source of power for 120 volt loads and 240 volts loads that are connected to a local power transmission system having a first-leg user line 300, a neutral user line 302, and a second-leg user line 304. The power source 298 may, for example, include a generator that is carried by a truck and the local transmission system may be used to distribute power to electric saws, lights, and other loads at a construction site. The power source 298 is connected to inverters 306 and 308, which are controlled respectively by inverter controllers 310 and 312, which receive sinusoidal signals via lines 314 and 316 from a relative phase controller 318. The relative phase controller 318 receives a 60 Hz signal from an oscillator 20. The relative phase controller 318 emits 60 Hz sinusoidal signals on lines 314 and 316. They are approximately 180° out-of-phase if a switch (not illustrated) in relative phase controller 318 is in one position and approximately in phase if the switch is in another position. It will be apparent that the relative phase controller permits the 240 volt loads to receive power or not, as previously discussed.

It will be understood that the above description of the present invention is susceptible to various modifications, changes, and adaptations, and the same are intended to be comprehended within the meaning and range of equivalents of the appended claims.

For example, the invention could be realized using, instead of a DC source, an AC source such as a generator whose windings can be separated to provide 2 phases, at least one of which can be adjusted either manually or via an adjustment mechanism and/or circuit.

What is claimed is:

1. A load reduction method for selectively dropping a first load that is connected between a first-leg line and a second-leg line while supplying power to a second load that is connected between a neutral line and one of the first-leg and second-leg lines, said method comprising:

(a) supplying AC power to the first-leg line;

(b) supplying AC power to the second-leg line, the AC power supplied to the second-leg line having a phase angle of about 180° with respect to the AC power supplied to the first-leg line; and (c) changing the phase angle of the second-leg line with respect to the first-leg line to about 0° to drop the first load while continuing to supply power to the second load.

2. The load reduction method of claim 1, wherein the AC power is supplied to the first-leg line at an rms voltage between about 100 volts and about 130 volts and the AC power is supplied to the second leg-line at an rms voltage between about 100 volts and about 130 volts.

3. The load reduction method of claims 2, wherein the AC power is supplied to the first-leg line at an rms voltage of about 120 volts, and wherein the AC power is supplied to the second-leg line at an rms voltage of about 120 volts.

4. The load reduction method of claim 2, wherein the voltage at which AC power is supplied to the first-leg line has a waveform that is approximately sinusoidal, and the voltage at which AC power is supplied to the second-leg line has a waveform that is approximately sinusoidal.

5. A load reduction method for selectively dropping a load that is connected between a first-leg line and a second-leg line while supplying power to another load that is connected between a neutral line and one of the first-leg and second-leg lines, said method comprising:

(a) monitoring a commercial power distribution system to detect a fault in the commercial power distribution system;

(b) supplying AC power from the commercial power distribution system to the first-leg line unless a fault has been detected and supplying AC power derived from an onsite power source to the first-leg line if a fault has been detected;

(c) supplying AC power to the second-leg line, the AC power supplied to the second-leg line having a phase angle of about 180° with respect to the AC power supplied to the first-leg line; and (d) changing the phase angle of the second-leg line with respect to the first-leg line to about 0° to drop the load that is connected between the first-leg and second-leg lines, wherein step (c) comprises supplying AC power from the commercial power distribution system to the second-leg line unless a fault has been detected and supplying AC power derived from the on-site power source to the second-leg line if a fault has been detected, and wherein step (d) is conducted when a fault is detected.

6. The load reduction method of claim 5, wherein the on-site power source is a DC power source, and wherein the step of supplying AC power derived from the on-site power source to the first-leg line if a fault has been detected and the step of supplying AC power derived from the on-site power to the second-leg line if a fault has been detected are conducted using at least one inverter, the at least one inverter being connected to the on-site power source.

7. The load reduction method of claim 6, wherein the steps of supplying AC power derived from an on-site power source to the first-leg and second-leg lines if a fault has been detected comprise controlling the at least one inverter in response to a first periodic signal having a predetermined frequency and a second periodic signal having a predetermined frequency that is substantially the same as the predetermined frequency of the first periodic signal.

8. The load reduction method of claim 7, wherein the first and second periodic signals are sinusoidal.

9. The load reduction method of claim 8, wherein the predetermined frequency of the first and secondperiodic signals is about 60 Hz.

10. The load reduction method of claim 8, wherein step (d) comprises shifting the phase of one of the first and second periodic signals with respect to the other of the first and second periodic signals by approximately 180° after a fault has been detected.

11. The load reduction method of claim 10, wherein the step of shifting the phase is conducted rapidly, in less than about 0.01 second.

12. The load reduction method of claim 11, wherein one of the first and second period signals is generated by a signal source, and wherein the step of shifting the phase comprises, for the other of the first and second periodic signals, switching to the signal source from an inverting amplifier that is connected to the signal source.

13. The load reduction method of claim 10, wherein the shifting of the phase is conducted slowly, taking more than about one second.

14. A load reduction system for selectively dropping a first load that is connected between a first-leg line and a second-leg line while supplying power to a second load that is connected between a neutral line and one of the first-leg and second-leg lines, comprising:

means for supplying AC power to the first-leg line;

means for supplying AC power to the second-leg line, the AC power supplied to the second-leg line having a phase angle of about 180° with respect to the AC power supplied to the first-leg line; and means for changing the phase angle to about 0° to drop the first load while continuing to supply power to the second load.

15. The load reduction system of claim 14, wherein the AC power is supplied to the first-leg line at an rms voltage between about 100 volts and about 130 volts, and the AC power is supplied to the second-leg line at an rms voltage between about 100 volts and about 130 volts.

16. The load reduction system of claim 15, wherein the voltage at which AC power is supplied to the first-leg line has a waveform that is approximately sinusoidal, and the voltage at which AC power is supplied to the second-leg line has a waveform that is also approximately sinusoidal.

17. A load reduction system for selectively dropping a load that is connected between a first-leg line and a second-leg line while supplying power to another load that is connected between a neutral line and one of the first-leg and second-leg lines, comprising:

means for monitoring a commercial power distribution system to detect a fault in the commercial power distribution system;

means for supplying AC power to the first-leg line;

means for supplying AC power to the second-leg line, the AC power supplied to the second-leg line having a phase angle of about 180° with respect to the AC power supplied to the first-leg line; and means for changing the phase angle to about 0° to drop the load that is connected between the first-leg and second-leg lines, wherein the means for supplying AC power to the first-leg line comprises means for supplying AC power from the commercial power distribution system to the first-leg line unless a fault has been detected and means for supplying AC power derived from an on-site power source to the first-leg line if a fault has been detected, wherein the means for supplying AC power to the second-leg comprises means for supplying AC power from the commercial power distribution system to the second-leg line unless a fault has been detected and means for supplying AC power derived from the on-site power source to the second-leg line if a fault has been detected, and wherein the means for changing the phase angle is actuated when a fault is detected.

18. A method for controlling electrical power consumption, comprising:

(a) supplying power to a first load that is connected between a neutral line and a first-leg line that carries an AC voltage, (b) supplying power to a second load that is connected between the first-leg line and a second-leg line that carries an AC voltage which is about 180° out of phase with the voltage carried by the first leg line;

(c) changing the phase of the AC voltage carried by the second-leg line to about 0° to drop the second load without dropping the first load.

19. The method of claim 18, further comprising supplying power to a third load that is connected between the second-leg line and the neutral line, wherein power continues to be supplied to the third load when the phase is changed in step (c).

20. The method of claim 18, wherein step (c) comprises switching an input of a phase locked loop from one of the first-leg and second-leg lines to a local oscillator.

* * * * *